United States Patent Office 2,890,913
Patented June 16, 1959

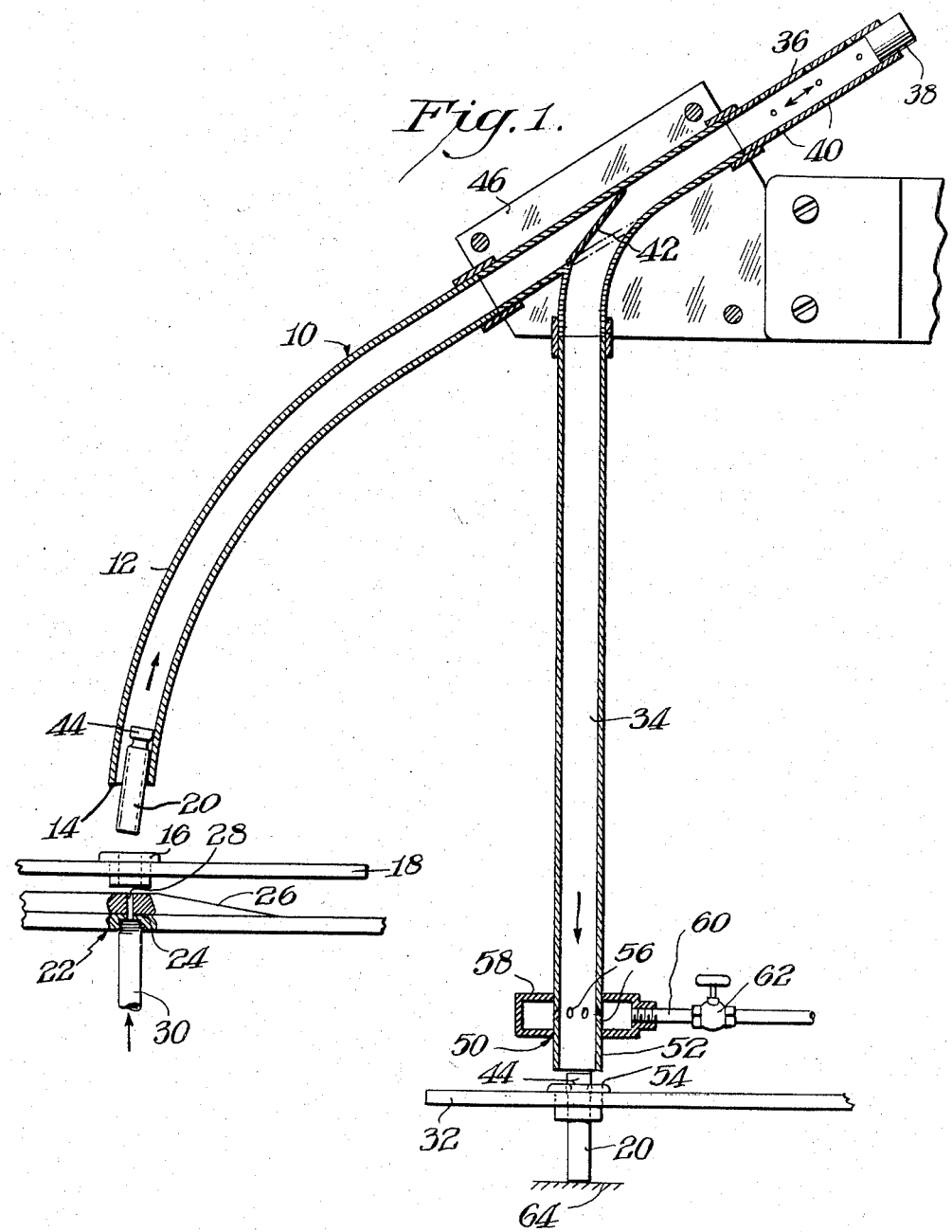

2,890,913

PNEUMATIC TRANSFER DEVICE

John J. Miskel, Brooklyn, and Carl H. Abbe, Maspeth, N.Y., Serge Sarasin, Zurich, Switzerland, and Herman G. Thulke, Massapequa, N.Y., assignors to Chas. Pfizer & Co., Inc., New York, N.Y., a corporation of Delaware Original application December 28, 1956, Serial No. 631,109, now Patent No. 2,841,937, dated July 8, 1958. Divided and this application April 25, 1958, Serial No. 730,979

6 Claims. (Cl. 302—2)

This invention relates to a pneumatic device for transferring articles from one stage of a processing apparatus to another, and more particularly relates to such a device in which the articles are discharged from the device in the same orientation in which they are delivered to it.

A fully automatic machine for assembling disposable cartridges for hypodermic syringes is described in copending application S.N. 631,109, filed December 28, 1956, now patent No. 2,841,937, of which this is a divisional application. In this copending application, a machine is described having a pair of turntables including recesses for receiving plungered vials which are filled and sealed and connected with needle assemblies to transform them into disposable cartridge and needle assemblies for use in hypodermic syringes. The vials are, for example, filled and sealed while they are carried in one of these turntables, and the needle assemblies are joined to the sealed vials in the other of these turntables.

A simple means is required for conveniently transferring articles from one stage of such a processing device to the other, for example, from one turntable to the other, without subjecting these articles to any abnormal shocks. It is also highly advantageous to deliver these articles to the receiving turntable in the same upright orientation that they were delivered to the transfer device from the discharging turntable because both processing stages operate upon the upper ends of the vials.

An object of this invention is to provide a simple means for conveniently transferring articles from one processing stage to another without subjecting the articles to abnormal shocks; and Another object is to provide such a device which discharges the articles in the same orientation that they are received.

In accordance with this invention, a novel transfer device includes an ascending tube disposed over an entrance station and a descending tube which discharges to an exit station, spliced to the ascending tube at its zenith to form a unitary terminal tube. A stopper means seals the end of the terminal tube, and trap door means is disposed at the junction of the ascending and decending tubes to permit the articles passing through the device to pass from the ascending tube into the descending tube after striking the stopper. Pneumatic means directs a stream of air below an article positioned at the mouth of the ascending tube to propel it through the device. An air inlet means may be circumferentially disposed adjacent the lower end of the descending tube for directing a stream of air radially inwardly into the descending tube to cushion the fall of articles dropping through it.

Novel features and advantages of the present invention will become apparent to one skilled in the art from a reading of the following description in conjunction with the accompanying drawing wherein similar reference characters refer to similar parts and in which Fig. 1, the single figure of drawings, is a cross-sectional view in elevation of one embodiment of this invention.

In Fig. 1 is shown a pneumatic transfer device 10 including an ascending tube 12 having its mouth 14 positioned above an exit station of one stage of a processing apparatus, for example, represented by apertured block or boss 16 in turntable 18.

Articles 20, for example filled and sealed vials 20, which are converted into cartridge and needle assemblies (not shown) for use in hypodermic syringes, are rotated by turntable 18 to an exit station represented by the position of recessed block or boss 16 where vials 20 are positioned directly above an air discharge or nozzle means 22 including, for example, plates 24 and 26 which are pierced by a nozzle or passageway 28 positioned directly below the apertures in bosses 16 when they are disposed at the exit station from turntable 18. A conduit, for example, tube 30, is connected to direct a stream of air through passageway 28 for propelling articles 20 into the mouth 14 of ascending tube 12.

Ascending tube 12 rises and inclines in a smooth curve towards another stage 32, for example turntable 32, of a processing appartus (not fully described herein). In this second turntable 32, for example, needle assemblies (not shown) are applied to the upper end, for example, of vials 20. Ascending tube 12 in joined, for example, by splicing to descending tube 34, for example, at the zenith or upper end of tube 34 to join with it to form a unitary terminal tube 36. Terminal tube 36 is closed by a stopper or bumper 38 made of a resilient material, for example, rubber. Terminal tube 36 is perforated by a number of holes 40 to promote an unimpeded flow of propelling air through ascending tube 12 which facilitates the propulsion of vials 20 through ascending tube 12 and against stopper or bumper 38.

A trap door means 42, for example, made of a leaf spring is attached to the junction of tubes 12 and 34 for permitting vials 20 to pass from tube 12 into terminal tube 36 and to prevent vials 20 from reentering tube 12 after striking bumper 38. Vials 20 are thereby channelled into descending tube 34, and the same vertical orientation of vials 20 in the ascending and descending tubes is maintained. Vials 20 are accordingly delivered to transfer device 10 and discharged from it with the sealed cap end 44 disposed uppermost which facilitates processing, for example, application of a needle assembly (not shown), while it is being carried in turntable 32.

The junction between tubes 12 and 34 is, for example, formed within a channelled block 46 including smoothly contoured passageways. Block 46 is, for example, formed of a transparent plastic, polyethylene for example, to permit observation of articles passing therethrough. Any obstructions in article flow can accordingly be easily observed and corrected.

An air inlet means 50 is, for example, circumferentially disposed adjacent lower end 52 of descending tube 34 for cushioning the fall of articles 20 dropping through it into the receiving station of turntable 32, for example represented by apertured block or boss 54, in turntable 32. Air inlet means 50 includes, for example, a number of orifices 56 circumferentially disposed, for example, at an upward slant to provide a rising cushion of air for braking the fall of vials 20. An annular chamber 58 surrounds orifices 56 to supply a flow of air thereto. A supply means 60, for example, a compressed air line is connected to chamber 58 for providing a flow of air under pressure to orifices 56. Valve 62 is, for example, connected in line 60 to control the flow of air to chamber 58 to provide a means for regulating the cushioning effect of the rising air stream.

Operation

When a vial 20 is positioned above passageway 28 in plate 26, a rising stream of air initiated, for example, by a control means (not shown) propels vial 20 through ascending tube 12 past resilient trap door 42 into terminal tube 36 and against bumper 38. The rising stream of air passes out through orifices 40 in terminal tube 36 leaving vial 20 in terminal tube 36 free to fall into descending tube 34 under the channelling influence of trap door 42.

As a vial 20 drops through tube 34, it gradually accelerates, but its fall is partially checked or cushioned by the rising stream of air passing upwardly through orifices 56 incorporated adjacent the lower end 52 of decending tube 34. Articles 20 are accordingly gently delivered to receiving compartments 54 of turntable 32 with their lower ends gently striking plate 64 disposed below turntable 32.

Since the upper ends 44 of articles 20 are maintained above turntable 32, they are in a convenient position for further processing, for example, the application of needle assemblies (not shown).

If any obstructions to flow should occur within junction block 46, they may easily be detected through the transparent walls thereof, and rubber bumper or plug 38 is, for example, easily removable from the end of terminal tube 36 to permit any obstructions to be readily cleared.

What is claimed is:

1. A pneumatic device for transferring articles from an entrance station to an exit station comprising an ascending tube disposed over said entrance station, a descending tube spliced to said ascending tube at its zenith to form a unitary terminal tube, said descending tube having an end disposed adjacent said exit station, stopper means sealing the end of said terminal tube, trap door means disposed at the junction of said ascending and descending tubes to permit said articles to pass from said ascending tube into said descending tube after striking said stopper means, said terminal tube being perforated to promote the flow of air together with said article through said ascending tube, said perforations being disposed in positions permitting a flow of air through them at all times even when an article lies within said terminal tube to facilitate the passage of articles into said terminal tube from said ascending tube and automatically from said terminal tube down through said descending tube, and pneumatic means for directing a stream of air under an article disposed at the entrance to said ascending tube to propel said article through said device.

2. A device as set forth in claim 1 wherein said trap door is comprised of a leaf spring attached to the junction of said ascending and descending tubes.

3. A device as set forth in claim 1 wherein air inlet means is circumferentially disposed adjacent the lower end of said descending tube for directing a stream of air radially inwardly into said descending tube for cushioning the fall of articles dropping therethrough.

4. A device as set forth in claim 3 wherein said air inlet means is inclined upwardly.

5. A device as set forth in claim 4 wherein said air inlet means includes a series of orifices circumferentially disposed about said descending tube, and wherein an annular chamber surrounds said descending tube and said orifices to provide an evenly distributed supply of air to said orifices.

6. A device as set forth in claim 1 wherein said stopper means is removable from said terminal tube to facilitate the clearance of obstructions to flow from said tubes.

References Cited in the file of this patent
UNITED STATES PATENTS

| | | |
|---|---|---|
| 570,161 | Fordyce | Oct. 27, 1896 |
| 944,487 | Jennings | Dec. 28, 1909 |